UNITED STATES PATENT OFFICE 2,674,631

PRODUCTION OF UNSATURATED FLUORINE COMPOUNDS

Charles B. Miller, Lynbrook, N. Y., and John D. Calfee, Dayton, Ohio, assignors to Allied Chemical & Dye Corporation, New York, N. Y., a corporation of New York No Drawing. Application August 3, 1951, Serial No. 240,292

4 Claims. (Cl. 260—653)

This invention relates to the preparation of monomeric dichloro vinylidene fluoride, $$(CCl_2=CF_2)$$

a material useful as a monomer in polymerization reactions and as a chemical intermediate.

In attempting to use monomeric $CCl_2=CF_2$ in chemical reactions according to the prior art, e. g. in polymerizing procedures, difficulty has been experienced in the formation of the dimer. Such dimer may be separated and recovered from the polymerization reaction mass by known methods e. g. distillation. This dimer, which is believed to have the structure

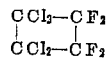

is quite stable and resistant to chemical attack or decomposition at temperatures even as high as 650° C. Hence, the dimer is refractory to changes to other more valuable forms and is not readily utilizable in polymerization operations.

One particular object of the present invention is to develop a simple, inexpensive and high yield process for converting the dimer of $CCl_2=CF_2$ into monomeric dichloro vinylidene fluoride, $CCl_2=CF_2$.

According to the present invention, we contact material comprising the dimer of dichloro vinylidene fluoride with aluminum fluoride catalyst of type more fully described below, under conditions which bring about decomposition or cracking of said dimer to produce the monomeric $CCl_2=CF_2$. Although the exact mechanism of the reaction is not apparent, the overall effect apears to be that each mol of cyclic dimer is split to produce 2 mols of dichloro vinylidene fluoride.

High conversions (percentage of starting material decomposed) and yields (percentage of desired product based on that theoretically obtainable from reactant decomposed) may be realized by suitably controlling reaction conditions.

Any suitable aluminum fluoride, which at the time of use is substantially anhydrous, may be employed in the reaction. Such aluminum fluoride may be substantially pure, may be of so-called commercial or technical grade containing the usual impurities and made, e. g. by reacting aqueous HF with aluminum oxide or hydrate and comprising lumps or particles which in turn are composed of $AlF_3$ crystals of relatively large size, i. e. not less than 1000 and usually several thousand Angstrom units radius and above; may be basic aluminum fluoride containing preferably at least about 95% $AlF_3$; or may be aluminum fluoride prepared by the reaction of $AlCl_3$ or other aluminum halide with liquid or gaseous fluorinating agent such as HF and comprising extremely small sub-microscopic crystals, i. e. "crystallites" which have crystal size below about 1000 Å. radius, ordinarily below about 500 Å. and preferably below about 200 Å., e. g. as made by the method more fully described in our copending application Serial No. 240,286 filed August 3, 1951, and directed to manufacture of $CCl_2=CClF$ from $CCl_2=CCl_2$. Anhydrous aluminum fluorides which contain at least about 95% $AlF_3$, preferably at least about 98% $AlF_3$, ordinarily possess the desired catalytic activity. Raw commercial aluminum fluorides may contain certain amounts of water, e. g. water of hydration. In order to produce the anhydrous aluminum fluoride catalyst preferred for the purpose of the present invention, such water is removed by heating under conditions to completely dry the aluminum fluoride while preventing hydrolysis thereof, e. g. heating at about 450° C. until the bulk of the water is removed and thereafter further heating at above about 600° C. until residual amounts of water have been removed.

We find that in order to initiate and maintain the desired reaction to an appreciable extent, temperatures above about 550° C. should be maintained at the point of contact between aluminum fluoride catalyst and dimer reactant. As temperature increases, rate of desired reaction also increases and particularly advantageous results are obtained at temperatures above about 600° C. Some of the desired decomposition of dimer to form monomer occurs at temperatures as high as about 750° C. and above, but due to practical considerations of economy and difficulties of heating, temperatures above about 750° C. are ordinarily not utilized. At temperatures of about 700° C. and below, optimum rate of decomposition is ordinarily obtained and hence this temperature is the upper limit of the preferred range.

Although not limited to continuous operations, the process of the invention is advantageously carried out thereby. Accordingly, particular procedure includes introducing gaseous dimer of $CCl_2=CF_2$ into a reaction zone containing aluminum fluoride catalyst, heating the material in the zone at the temperatures outlined above for a time sufficient to decompose an appreciable amount of dimer to form gaseous reaction product containing $CCl_2=CF_2$ monomer and withdrawing said product from the reaction zone. If desired, the catalyst may be used in the form of a fluidized solid bed in process gas in the reaction zone.

The time of contact between reactant and aluminum fluoride catalyst is a factor to be considered and controlled in obtaining desired degree of dimer decomposition. As rate of throughput of material through the reaction zone (space velocity) increases, time of contact of each increment of reactant gas with catalyst decreases, causing, generally, decrease in conversion. Space velocity of gaseous material passing through the reaction zone is controlled to obtain time of contact between reactant and catalyst sufficient to bring about the desired formation of monomeric $CCl_2=CF_2$. Although side reactions in our process are ordinarily at a minimum due to the stability of reactant and product, and hence, high yields of desired product are ordinarily obtained even at low space velocities and long times of contact, in the interest of obtaining high reactor capacity and good economy of operation, time of contact is usually kept at a minimum (space velocity at a maximum) consistent with high conversion of dimer to monomer. In a particular operation optimum rate of flow of feed material through the reaction zone is dependent upon variables such as scale of operation, quantity of catalyst in the reactor and the specific operation employed, and may be best determined by a test run.

Since the dimer starting material exists as a gas at reaction temperatures (boiling point 131° C.), if desired, the pure dimer can be utilized as a reactant in the process of our invention and passed as substantially pure vapor over the aluminum fluoride catalyst to form monomer. However, in particular operations, it may be desired first to melt the dimer (melting point 81° C.) and pass an inert gas through the liquid to form gaseous material comprising monomer and inert gas which is subsequently introduced into the reaction zone. Needless to say, other gaseous material comprising $CCl_2=CF_2$ dimer may be utilized as starting material in the reaction of the present invention if such material is available. However, in most instances, particularly in the interest of facilitating recovery of monomer from the gaseous reaction product mixture, it is preferred to utilize substantially pure dimer as reactant.

The reactor may be constructed of any suitable material capable of withstanding the reaction temperatures in the presence of reactants and products. Silica and graphite are examples of suitable materials, and metals which may be employed include nickel and inconel. A reactor of sufficient diameter to permit passage of the amount of material to be treated without undue pressure drop, and having sufficient length to accommodate the amount of aluminum fluoride catalyst required to effect the desired cracking is employed.

For convenience, atmospheric pressure operation is preferred. The reaction may, if desired, be carried out at super-atmospheric or sub-atmospheric pressure, the choice being largely one of convenience; e. g. determined by the nature of prior treatment of the starting material or subsequent treatment of the reaction product.

The various reaction products may be recovered separately or in admixture, from the reaction zone exit gas stream in any suitable manner. The gas discharged from the reactor zone may be passed through a condenser and trap maintained at about room temperature initially to condense high boiling materials. Any small amounts of uncracked dimer plus monomer dissolved therein will be collected in this trap. Uncondensed gases leaving the first condenser may be scrubbed with caustic soda solution or soda lime to remove any possible traces of acidic material and then dried by means of anhydrous calcium chloride. The clean dry gas stream then may be introduced into a second, ice-cooled condenser maintained at about 0° C. In this condenser, monomeric $CCl_2=CF_2$ (B. P. 19.6° C.) is collected. Product and unconsumed reactant may be recovered individually from the condensates indicated by fractional distillation under suitable conditions.

The following example illustrates practice of this invention, parts and percentages being by weight:

*Example*

75 parts of commercial aluminum fluoride catalyst containing 99+% $AlF_3$ and composed of particles in the size range 6 to 16 mesh were mounted in a horizontal ¾ inch I. D. and 4 feet long silica tube fitted with a center thermocouple well for internal temperature measurement. The reactor was encased in an electrically heated furnace and provided with inlet and outlet tubes for passage of reactant and gaseous product, respectively. Liquid $CCl_2=CF_2$ dimer was introduced into the inlet end of the reactor tube at the rate of 150 parts per hour. The heat in the inlet end of the tube served to vaporize the dimer and the reactant thereafter passed through the catalyst zone in the reactor while maintaining temperature in said zone in the range of 640–660° C. Product gas was passed through a first condenser and trap kept at room temperature to condense high boilers, through a tower packed with soda lime and $CaCl_2$ to remove acidic constituents and water and into a condenser-trap cooled with Dry Ice and acetone to effect substantially total condensation. After proceeding in this manner for about 1 hour, during which time 150 parts of dimer had been charged, reactant feed was discontinued and the condensate (containing unreacted dimer) collected in the first trap was heated to effect total vaporization thereof. These vapors were passed through the soda lime and $CaCl_2$ tower described above and into the second (low temperature) condenser. The cold trap condensates were combined and subjected to fractionation to recover pure materials. Of the 150 parts of dimer charged, 118 parts or approximately 79% were converted. 107 parts of monomeric $CCl_2=CF_2$ were recovered, representing a yield of 91% of theoretical.

We claim:

1. The process for forming $CCl_2=CF_2$ from the dimer of $CCl_2=CF_2$ which comprises contacting gaseous material comprising said dimer with aluminum fluoride catalyst at temperature in the approximate range 550–750° C. for time sufficient to decompose a substantial amount of said dimer to form a substantial amount of $CCl_2=CF_2$.

2. The process for forming $CCl_2=CF_2$ which comprises heating $$\begin{array}{c} CCl_2-CF_2 \\ | \quad\quad | \\ CCl_2-CF_2 \end{array}$$

in the gas phase in the presence of aluminum fluoride catalyst content at temperature in the approximate range 600–700° C. for time sufficient to decompose a substantial amount of said

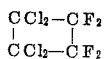

to form a substantial amount of $CCl_2=CF_2$.

3. The process which comprises introducing gaseous material comprising the dimer of $CCl_2=CF_2$ into a reaction zone containing aluminum fluoride catalyst having not less than about 95% $AlF_3$ content, heating said material in said zone at temperature in the approximate range 550–750° C. for time sufficient to decompose a substantial amount of said dimer to form gaseous reaction product containing a substantial amount of $CCl_2=CF_2$ and withdrawing said product from said zone.

4. The process for forming $CCl_2=CF_2$, which comprises introducing the compound

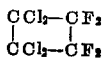

in the gas phase into a reaction zone containing aluminum fluoride catalyst having not less than about 95% $AlF_3$ content, heating said compound in said zone at temperature in the approximate range 600–700° C. for time sufficient to decompose a substantial amount of said compound to form gaseous reaction product containing a substantial amount of $CCl_2=CF_2$, withdrawing said product from said zone and recovering said $CCl_2=CF_2$ from said product.

References Cited in the file of this patent

UNITED STATES PATENTS

| Number | Name | Date |
|---|---|---|
| 2,406,153 | Lewis | Aug. 20, 1946 |
| 2,543,530 | Kropa et al. | Feb. 27, 1951 |